United States Patent Office 3,417,042
Patented Dec. 17, 1968

3,417,042
PROCESS FOR PREPARING A POLYAMIDE
ACID SOLUTION
Richard F. Gaertner, Rexford, and Fred F. Holub, Scotia,
N.Y., assignors to General Electric Company, a corporation of New York
No Drawing. Filed June 24, 1966, Ser. No. 560,087
11 Claims. (Cl. 260—30.2)

ABSTRACT OF THE DISCLOSURE

Polyamide acid solutions are produced by reacting (a) a dianhydride of the class consisting of benzophenone dianhydride, pyromellitic dianhydride, ethyleneglycol bistrimellitate dianhydride, and a dianhydride of the formula

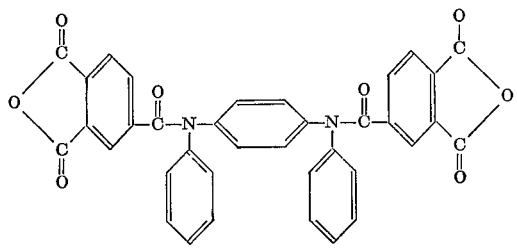

with (b) at least one diamine of the class consisting of $C_2$–$C_8$ alkylenediamine, m-phenylenediamine and diamines having the formula

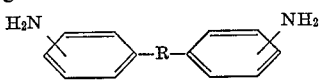

where R is a divalent radical of the class consisting of $C_{1-3}$ alkylene,

—O—, and

in an anhydrous solvent mixture of (i) a non-reactive non-hydroxylic organic solvent and (ii) a phenolic body selected from the class consisting of phenol and cresol and mixtures thereof, said phenolic body present in amounts of about from 35 to 60 weight percent of the total weight of the solvent mixture while maintaining the temperature from 20° C. to 40° C. The polyamide acid solutions find use as bonding agents for glass fibers, for coating metal substrate and electrical insulating films.

---

This invention relates to synthetic polymer compositions and methods for preparing such materials. More particularly, the invention is concerned with a process for making a polyamide acid solution which comprises (1) forming in an anhydrous solvent mixture of (i) a non-reactive, non-hydroxylic organic solvent and (ii) a phenolic body selected from the class consisting of phenol, cresol, and mixtures of phenol and cresol, said body present in at least 35 weight percent of the total weight of the solvent mixture, a mixture of ingredients comprising (a) at least one dianhydride selected from the group consisting of benzophenone dianhydride (e.g., 2,2′,3,3′-2,3,3′,4′-, 3,3′,4,4′-benzophenonetetracarboxylic acid dianhydride), pyromellitic dianhydride, ethylene glycol bis trimellitate anhydride, and a dianhydride having the formula

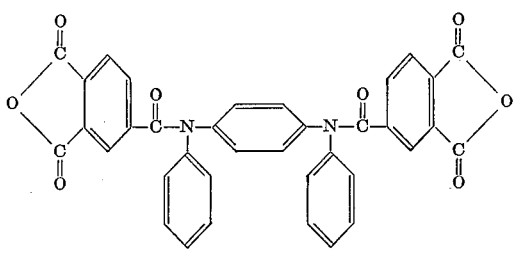

(b) at least one diamine selected from the group consisting of $C_{2-8}$ alkylenediamines, m-phenylenediamine, and diamines having the formula

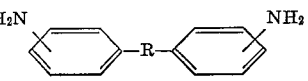

where R is a diavalent radical selected from the group consisting of $C_{1-3}$ alkylene,

—O—, and

and (2) allowing the reactants to interact at a temperature below 40° C., e.g., from 20° C. to ambient temperatures, such as 25 to 30° C., to form the polyamide acid.

U.S. Patent 3,179,614, issued Apr. 29, 1965, describes a class of resins comprising polyamide acid resins which are generally prepared by the reaction of a dianhydride of a tetracarboxylic acid with various diamines. The most widely used dianhydride is pyromellitic dianhydride, although this patent does describe a number of other dianhydrides. In accordance with this patent, the dianhydride and the diamine are reacted in the presence of a number of recited organic solvents for both the reactants and the intermediate polymeric acid amide. This patent points out the need for employing solvents for the reaction which are relatively expensive and not readily available. Moreover, the methods used to make the intermediate polyamide acids usually results in some imidization with problems of insolubility and possible precipitation of the polymer, even in these somewhat exotic solvents. Even if precipitation can be avoided, the usual presence of polyimide groups often requires higher temperatures of molding and shaping than are desirable.

It is therefore desirable that the polyamide acid remain fully soluble in the reaction solvent even at room temperature so as to permit the use of the solution for coating purposes, or that the highly fusible and soluble polyamide acid polymer can be isolated by precipitation or evaporation of the solvent, and recovered still in a soluble state substantially free of polyimide groups. After shaping or coating a substrate, the polyamide acid is readily converted to the polyimide form by chemical or thermal means to produce products having excellent solvent resistance and resistance to flow at elevated temperatures.

Unexpectedly it has been discovered that it is possible to prepare such soluble polyamide acid resins exhibiting low solution viscosity in anhydrous solvent mixtures of non-reactive, non-hydroxylic organic solvents with phenol, with the various cresols, e.g., ortho-, meta- and para-cresol, or with cresol-phenol mixtures. These resins are substantially free of any polyimide groups. Commercially available cresol from coal tar is a mixture of isomers which is liquid at room temperature and is ideal as a portion of the solvent for our process. It is equally significant that it is possible to use such a relatively inexpensive phenolic body of phenol, cresol, or mixtures of phenol and cresol in amounts equal to at least 35 weight percent of the total weight of the solvent mixture to make the polyamide acid resin in solution and to carry out the reaction at room temperature rapidly. The preferred weight percent of the phenolic body to the total weight percent of the solvent mixture is 35 to 60 weight percent. However, if the amount of phenolic body is varied to higher weight percents, a soluble solution cannot be obtained from the reactants. The mixtures of cresol and phenol can be varied widely from 5 to 95 weight percent phenol and from 95 to 5 weight percent cresol in such mixtures. The solubility and low solution viscosity of this polymeric system results in improved ability to impregnate porous materials, easier coating of wires by means of dies, etc., at high solids content.

Various anhydrous, non-reactive, non-hydroxylic organic solvents which are useful in the solvent mixture in the present invention are the organic solvents whose functional groups do not react with either of the reactants (the diamines or the dianhydrides) to a greater extent than the reactants do with each other. Besides being inert to the system and, preferably, being a solvent for the product, the organic solvent must be a solvent for at least one of the reactants, preferably for both of the reactants. Thus, the organic solvent is an organic liquid other than either reactant or homologs of the reactants, that is, a solvent for at least one reactant, and contains functional groups, the functional groups being groups other than monofunctional primary and secondary amino groups and other than the monofunctional dicarboxylanhydro groups. The non-reactive organic solvent is free of any aliphatic or aromatic hydroxyl group. The normally liquid organic solvents of the N,N-dialkylcarboxylamide class are useful as solvents in the process of this invention. The lower molecular weight members of this class, particularly N,N-dimethylformamide and N,N-dimethylacetamide may easily be removed from the polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which are useful in the present invention are: N-methyl-2-pyrrolidone, tetramethylene urea, dimethylsulfoxide, dimethylsulfone, tetramethylenesulfone, N-acetyl-2-pyrrolidone, etc.

The various diamines which have been found useful for reacting with the above-described dianhydrides are the various alkylenediamines, especially those in which the alkyl group contains from two to eight carbon atoms, e.g., ethylenediamine, propylenediamine, butylenediamine, 2-methylpropylenediamine, 1,2 - diaminobutane, pentamethylenediamine, hexamethylenediamine, heptamethylenediamine, octamethylenediamine, etc. Of the various diaminobenzenes, m-phenylenediamine will give polymers with the carbonyl-diphthalic anhydrides which are soluble in the solvents. Of the various binuclear diamines, those diamines in which one amino group is on each of the phenyl groups and the phenyl groups are separated by an alkylene, carbonyl, oxygen or sulfonyl radical will give polymeric products with the dianhydrides which are soluble in the solvent. Typical examples of such diamines are the various ortho-, meta-, and para-oxydianilines, e.g., 2,2'-oxydianiline, 3,3'-oxydianiline, 4,4'-oxydianiline, 2,3'-oxydianiline, 2,4'-oxydianiline, 3,4'-oxydianiline, etc.; the alkylenedianilines, especially those in which the alkylene group has from one to three carbon atoms, e.g., methylenedianiline, ethylidenedianiline, ethylenedianiline, propylidenedianiline, propylenedianiline, etc., including the various ortho-, meta- and para-isomers thereof, the various ortho-, meta- and para-isomers of diaminobenzophenone, and the various ortho-, meta- and para-isomers of sulfonyldianiline. Of these diamines, m-phenylenediamine (m-PDA), 4,4'-oxydianiline (ODA), 4,4'-methylenedianiline (MDA), and 4,4'-sulfonyldianiline are the most readily available. The alkylenediamines generally produce polymeric imides with the carbonyldiphthalic anhydrides which have lower softening points and less resistance to oxidation at elevated temperatures than the polyimides prepared from the aromatic diamines listed above. Therefore, when such properties are required, it is preferred to use the aromatic diamines.

In carrying out the reaction it is preferable to add the dianhydride to the solvent mixture, after which the diamine is added. The mixture is allowed to remain advantageously with stirring at ambient temperatures employing cooling if necessary to maintain the temperature of the mixture below 40° C. to avoid polyimide formation. The initial temperature, before the addition of the diamine, should be about or below room temperature. After the addition of the diamine, the temperature usually rises 10 to 15 degrees, due to the fact that the reaction is exothermic. At these temperatures, the addition reaction to form the polyamide acid is usually complete at the end of about 30 minutes to one hour, as is shown by the increase in the viscosity of the reaction mixture. The cyclicization reaction to form the polymeric imides proceeds advantageously at a temperature of about 125° C. to 300° C. to form a clear flexible film when cast on a glass substrate. In applying coatings or depositing films from solution the temperatures used to remove the solvent should be raised gradually to obtain smooth coatings and films.

Of the various dianhydrides, the most readily available and preferred dianhydrides are 3,3',4,4'-benzophenonetetracarboxylic acid dianhydride, which may be made in the manner described in U.S. 3,078,379, McCracken et al., pyromellitic dianhydride, ethylene glycol bis trimellitate anhydride, and the dianhydride of Formula I.

In forming the polymeric products it is only required to mix one or more of the dianhydrides with one or more of the above named diamines in the presence of the liquid organic solvent; they dissolve rapidly and appear to react in a short period of time to produce a polymeric amide acid solution which remains liquid and homogenous at room temperature. If desired, an inert atmosphere, e.g., nitrogen, can be used in the reaction vessel to retard oxidation of the amines to produce lighter colored polymers. It is preferred to use essentially equimolar amounts of the dianhydride and the diamine, although a slight excess, e.g., 1.05 moles of the diamine per mole of the dianhydride is advantageously used. Monoamines such as aniline, p-biphenylamine, benzylamine, or anhydrides of a dicarboxylic acid, such as phthalic anhydride or maleic anhydride or other reagents reactive with amines or carboxylic acids may be used to chain-stop or modify the polymers. These may be added at the start, during, or at the end of the polymer-forming reaction and may be used to react with any slight excess of either the diamine or dianhydride used initially.

The amount of organic solvent used should be sufficient to produce a homogenous solution with the reactants and polyamide acid polymer, and yet not be too viscous so as to introduce handling problems. Optimum concentrations are in the range of 5 to 40 percent, by weight, polyamide acid polymer and 60 to 95 percent, by weight, solvent mixture, based on the end use.

In order that those skilled in the art may better understand how the invention may be practiced, the following examples are given by way of illustration and not by way of limitation. All percentages are by weight, unless otherwise stated. Anhydrous conditions were maintained at all times.

EXAMPLE 1

In this example, to 800 grams of phenol and 800 grams of N,N-dimethylformamide were added 295.8 grams of 3,3',4,4'-benzophenonetetracarboxylic acid dianhydride (BPDA). This mixture was heated slightly until the BPDA dissolved. After the mixture cooled again to room temperature, 104.2 grams of m-PDA were added with stirring. When the addition of m-PDA was complete, the mixture was subsequently stirred for two hours at room temperature. The resulting polymer solution with 20 weight percent of polymer in the solution exhibited a viscosity of 1900 centistokes. The intrinsic viscosity of the polymer was 0.22. A sample of this solution was applied to a rectangular copper wire, and the polymer was cured at 300° C. to yield an adherent flexible film.

EXAMPLES 2–9

In these examples, various dianhydrides were reacted with various diamines in various solvent mixtures in the same manner as was done in Example 1. The dianhydrides used were BPDA, pyromellitic dianhydride (PMDA), Formula I type, and ethylene glycol bis trimellitate anhydride (TDA). The diamines used were m-PDA, ODA, MDA and hexamethylenediamine (HMDA). The solvent mixtures included N-methyl-2-pyrrolidone (N-MP), and dimethylsulfoxide (DMSO). Again, in preparing the polyamide acid solutions, care was exercised to counteract the exotherm of the reaction and to keep the temperature as close to room temperature as possible. The following Table 1 shows the ingredients and proportions of ingredients used. In each example an adherent, flexible film was derived by casting the intermediate resin solution on a glass substrate and thereafter gradually heating the cast film for about 3 to 30 minutes, depending on the nature of the polyamide acid, at a temperature of about 30 to 300° C.

TABLE 1

| Example | A Dianhydride | | B Diamine | | Solvent | | |
|---|---|---|---|---|---|---|---|
| | Type | Grams | Type | Grams | Wt. percent | Type | Grams |
| 2 | BPDA | 295.8 | m-PDA | 104.2 | 50 | Phenol | 800.0 |
| | | | | | 50 | N-MP | 800.0 |
| 3 | BPDA | 12.88 | m-PDA | 4.32 | 50 | Phenol | 34.4 |
| | | | | | 50 | N-MP | 34.4 |
| 4 | BPDA | 6.44 | ODA | 4.00 | 53 | Cresol | 18.0 |
| | | | | | 47 | DMSO | 16.0 |
| 5 | PMDA | 4.40 | MDA | 4.00 | 53 | Cresol | 18.0 |
| | | | | | 47 | DMSO | 16.0 |
| 6 | Formula I | 6.08 | HMDA | 1.16 | 53 | Cresol | 18.0 |
| | | | | | 47 | DMSO | 16.0 |
| 7 | BPDA | 3.22 | m-PDA | 1.11 | 35 | Phenol | 6.1 |
| | | | | | 65 | N-MP | 11.3 |
| 8 | TDA | 4.10 | MDA | 2.04 | 60 | Phenol | 14.7 |
| | | | | | 40 | N-MP | 9.8 |
| 9 | BPDA | 3.22 | m-PDA | 1.11 | 50 | Phenol-Cresol | 1.7 |
| | | | | | | | 15.7 |
| | | | | | 50 | N-MP | 17.4 |

Although the utility of the polymer solutions of the present invention have been described in the above-mentioned patents principally in terms of applications as flexible films, it should be understood that these polymers may be used in other applications suitable for such compositions. Thus, these polyamide acid resins can be converted to polyimides and employed as insulation over a conducting core. Additionally, these polyimides can be employed over a conducting core previously coated with another polymer, or vice versa, to give laminated, insulated coatings on the wire to improve the properties of the other insulation. They may also be used as dipping varnishes to impregnate coils of previously insulated wire, i.e., in the motor and generator rotors, field coils, etc. These resins may also be used in molding powder formulations by mixing with various fillers, for example, wood flour, diatomaceous earth, carbons, silica, abrasive grains, e.g., carborundum, diamond grit, etc. These polymers are also useful in preparing fibers, as impregnants, and bonding materials for metallic and fibrous laminates, etc. The polymers in film form are suitable as a dielectric in making capacitors, as slot insulation in motors, etc.

It has been found that in accordance with the process herein described that it is possible to synthesize completely aromatic polyamide acid resins in the above anhydrous, organic solvent mixtures at room temperature. This simple direct process allows the preparation of coating solutions that are easily prepared, thereby permitting greater flexibility on application to glass and metal surfaces. Very simple mixing techniques are applied to produce a polymer solution useful for bonding glass fibers, for making laminations and for coating metal substrates for use as thermal and electrical insulating films.

It will of course be apparent to those skilled in the art that other benzophenone dianhydrides and other diamines may be employed in place of those recited in the foregoing examples, many illustrations of these reactants being previously, without departing from the scope of the invention. The ratio of reactants as well as the proportions of the organic solvent may also be varied within the ranges recited above. It is also to be understood that the conditions of reaction, formation of intermediate polyamide acid, and of the ultimate polyimide product can also be varied widely in accordance with the intended invention. The incorporation of other additives, such as light stabilizers, oxidation inhibitors, levelling additives, etc., is not precluded.

What we claim as new and desire to secure by Letters Patent of the United States is:

1. A process for making a polyamide acid solution which comprises (1) forming in an anhydrous solvent mixture of (i) a non-reactive, non-hydroxylic organic solvent selected from the class consisting of liquid N,N-dialkyl-carboxylamides, N - methyl - 2 - pyrroidone, tetra - methylene urea, dimethylsulfoxide, dimethylsulfone, tetramethylenesulfone, N - acetyl - 2 - pyrrolidone and (ii) a phenolic body selected from the class consisting of phenol, cresol and mixtures of phenol and cresol, said body present in about 35 to 60 weight percent of the total weight of the solvent mixture, a mixture of ingredients comprising (a) at least one dianhydride selected from the group consisting of benzophenone dianhydride, pyromellitic dianhydride, ethylene glycol bis trimellitate anhydride, and a dianhydride having the formula

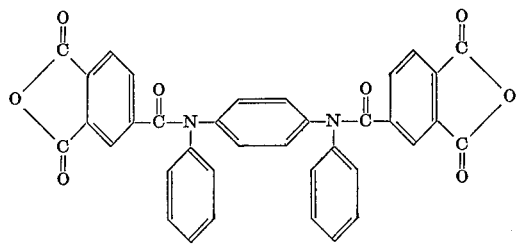

and (b) at least one diamine selected from the group consisting of $C_{2-8}$ alkylenediamines, m - phenylenediamine and diamines have the formula

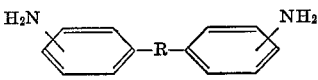

where R is a divalent radical selected from the group consisting of $C_{1-3}$ alkylene,

—O—, and

and (2) allowing the reactants to interact at a temperature below 40° C. to form the polyamide acid.

2. A process as in claim 1, wherein the diamine is m-phenylenediamine.

3. A process as in claim 1, wherein the diamine is 4,4'-methylenedianiline.

4. A process as in claim 1, wherein the diamine is 4,4'-oxydianiline.

5. A process as in claim 1, wherein the diamine is hexamethylenediamine.

6. A process as in claim 1, wherein the benzophenone dianhydride is 3,3',4,4' - benzophenonetetracarboxylic acid dianhydride.

7. A process as in claim 1, wherein the dianhydride is pyromellitic dianhydride.

8. A process as in claim 1, wherein the solvent mixture of phenol and N - methyl - 2 - pyrrolidone contains from 35 to 60 weight percent of phenol.

9. A process as in claim 1, wherein the solvent mixture of phenol and dimethyl formamide contains from 35 to 60 weight percent of phenol.

10. A process as in claim 1, wherein the solvent mixture of cresol and dimethylsulfoxide contains from 35 to 60 weight percent of cresol.

11. A process as in claim 1, wherein the solvent mixture of cresol - phenol and N - methyl - 2 - pyrrolidone contains from 35 to 60 weight percent of cresol-phenol mixture.

References Cited

UNITED STATES PATENTS

| | | | |
|---|---|---|---|
| 3,260,691 | 7/1966 | Lavin | 260—78 |
| 3,179,614 | 3/1965 | Edwards | 260—78 |
| 3,190,856 | 6/1965 | Lavin | 260—78 |
| 3,277,043 | 10/1966 | Holub | 260—78 |
| 3,316,211 | 4/1967 | Angelo | 260—78 |

FOREIGN PATENTS 570,858  7/1945  Great Britain.

ALLAN LIEBERMAN, *Primary Examiner.*

U.S. Cl. X.R.

260—30.8, 32.6, 33.4